United States Patent
Head et al.

(10) Patent No.: US 11,260,772 B2
(45) Date of Patent: Mar. 1, 2022

(54) SYSTEM, METHOD AND APPARATUS THAT DETECT AND REMEDY BATTERY HEALTH CONDITIONS

(71) Applicant: GM GLOBAL TECHNOLOGY OPERATIONS LLC, Detroit, MI (US)

(72) Inventors: Chans C. Head, Royal Oak, MI (US); Carl J. Hering, Farmington Hills, MI (US); Joshua D. Smith, Fowlerville, MI (US); Robert Wittmann, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 148 days.

(21) Appl. No.: 16/668,304

(22) Filed: Oct. 30, 2019

(65) Prior Publication Data
US 2021/0129705 A1 May 6, 2021

(51) Int. Cl.
*H02J 7/00* (2006.01)
*B60L 58/16* (2019.01)
*H01M 10/42* (2006.01)

(52) U.S. Cl.
CPC ......... *B60L 58/16* (2019.02); *H01M 10/4257* (2013.01); *H01M 2010/4271* (2013.01); *H01M 2220/20* (2013.01)

(58) Field of Classification Search
CPC ............... B60L 58/16; H01M 10/4257; H01M 2220/20; H01M 2010/4271
USPC ..................................... 320/109, 132; 701/22
See application file for complete search history.

(56) References Cited

U.S. PATENT DOCUMENTS

2011/0082621 A1\* 4/2011 Berkobin ................ B60L 58/10
701/31.4
2016/0349330 A1\* 12/2016 Barfield, Jr ............ G07C 5/008

\* cited by examiner

*Primary Examiner* — Zixuan Zhou
(74) *Attorney, Agent, or Firm* — Quinn IP Law

(57) ABSTRACT

An apparatus and method that detects and remedies a battery health condition are provided. The method includes receiving data including one or more of vehicle sensor information, dealer information and vehicle characteristic information, analyzing the received data to determine whether one or more battery health alerts are required, and outputting or transmitting the one or more determined battery health alerts.

16 Claims, 2 Drawing Sheets

SYSTEM, METHOD AND APPARATUS THAT DETECT AND REMEDY BATTERY HEALTH CONDITIONS

INTRODUCTION

Systems, Apparatuses and methods consistent with exemplary embodiments relate to diagnosing vehicle health. More particularly, systems, apparatuses and methods consistent with exemplary embodiments relate to diagnosing battery health based on information from the vehicle.

SUMMARY

One or more exemplary embodiments provide a method and an apparatus that diagnose a battery health condition to avoid battery damage. More particularly, one or more exemplary embodiments provide a method and an apparatus that analyze vehicle sensor data, vehicle characteristic data and dealer information to remedy potential battery health conditions.

According to an aspect of an exemplary embodiment, a method that detects and remedies a battery health condition is provided. The method includes receiving data including two or more of vehicle sensor information, dealer information and vehicle characteristic information, analyzing the received data to determine whether one or more battery health alerts are required, and outputting or transmitting the one or more determined battery health alerts.

The method further includes performing battery maintenance according to the determined battery health alert.

The performing battery maintenance according to the determined battery health alert may include charging one or more batteries listed in the determined battery health alerts by activating a battery charger or starting one or more vehicles corresponding to the one or more batteries.

The vehicle sensor information may include one from among location information, a battery state of charge, a power mode setting, a startup battery state of charge, a high precision battery state of charge, an open circuit battery voltage, and a battery temperature.

The dealer information may include one or more from among dealer location information, climate information, region information, charging date information, charging interval information, and a charging coordinator.

The vehicle characteristic information may include one or more from among a sale date, an assembly plant, a battery characteristic, vehicle component information, and a trim level.

The receiving data may be performed once per predetermined period, the period being between one and seven days.

The outputting or transmitting the one or more determined battery health alerts may include generating a table including a list of the determined battery health alerts with corresponding dealers and transmitting the list to the dealers in the list.

The analyzing the received data may further include determining if a vehicle has a low state of charge based on the battery state of charge, the startup battery state of charge, the high precision battery state of charge, the open circuit battery voltage, and the battery temperature of the vehicle sensor information and determining the battery health alerts that correspond to the vehicle that has the low state of charge.

The analyzing the received data may further include determining if a vehicle has had a low state of charge more than a threshold number of times over a predetermined period of time, selecting the vehicle information and dealer information corresponding to the vehicle, and determining the battery health alerts corresponding to the selected vehicle information and dealer information.

According to an aspect of an exemplary embodiment, a system that detects and remedies a battery health condition is provided. The system includes at least one memory comprising computer executable instructions and at least one processor configured to read and execute the computer executable instructions. The computer executable instructions cause the at least one processor to receive data including one or more of vehicle sensor information, dealer information and vehicle characteristic information, analyze the received data to determine whether one or more battery health alerts are required, and transmit the one or more determined battery health alerts.

The system may include a vehicle configured to perform battery maintenance according to the determined battery health alert.

The vehicle may be configured to perform battery maintenance by charging one or more batteries listed in the determined battery health alerts by activating a battery charger or starting an engine configured to charge a battery listed in the determined battery health alerts.

The vehicle sensor information may include one from among location information, a battery state of charge, a power mode setting, a startup battery state of charge, a high precision battery state of charge, an open circuit battery voltage, and a battery temperature.

The dealer information may include one or more from among dealer location information, climate information, region information, charging date information, charging interval information, and a charging coordinator.

The vehicle characteristic information may include one or more from among a sale date, an assembly plant, a battery characteristic, vehicle component information, and a trim level.

The computer executable instructions may cause the at least one processor to receive data once per predetermined period, the period being between one and seven days.

The computer executable instructions may cause the at least one processor to generate a table including a list of the determined battery health alerts with corresponding dealers and to transmit the list to the dealers in the list.

The computer executable instructions may cause the at least one processor to analyze the received data by determining if a vehicle has a low state of charge based on the battery state of charge, the startup battery state of charge, the high precision battery state of charge, the open circuit battery voltage, and the battery temperature of the vehicle sensor information and determining the battery health alerts that correspond to the vehicle that has the low state of charge.

The computer executable instructions may cause the at least one processor to analyze the received data by determining if a vehicle has had a low state of charge more than a threshold number of times over a predetermined period of time, selecting the vehicle information and dealer information corresponding to the vehicle, and determining the battery health alerts corresponding to the selected vehicle information and dealer information.

Other objects, advantages and novel features of the exemplary embodiments will become more apparent from the following detailed description of exemplary embodiments and the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Figure 1:
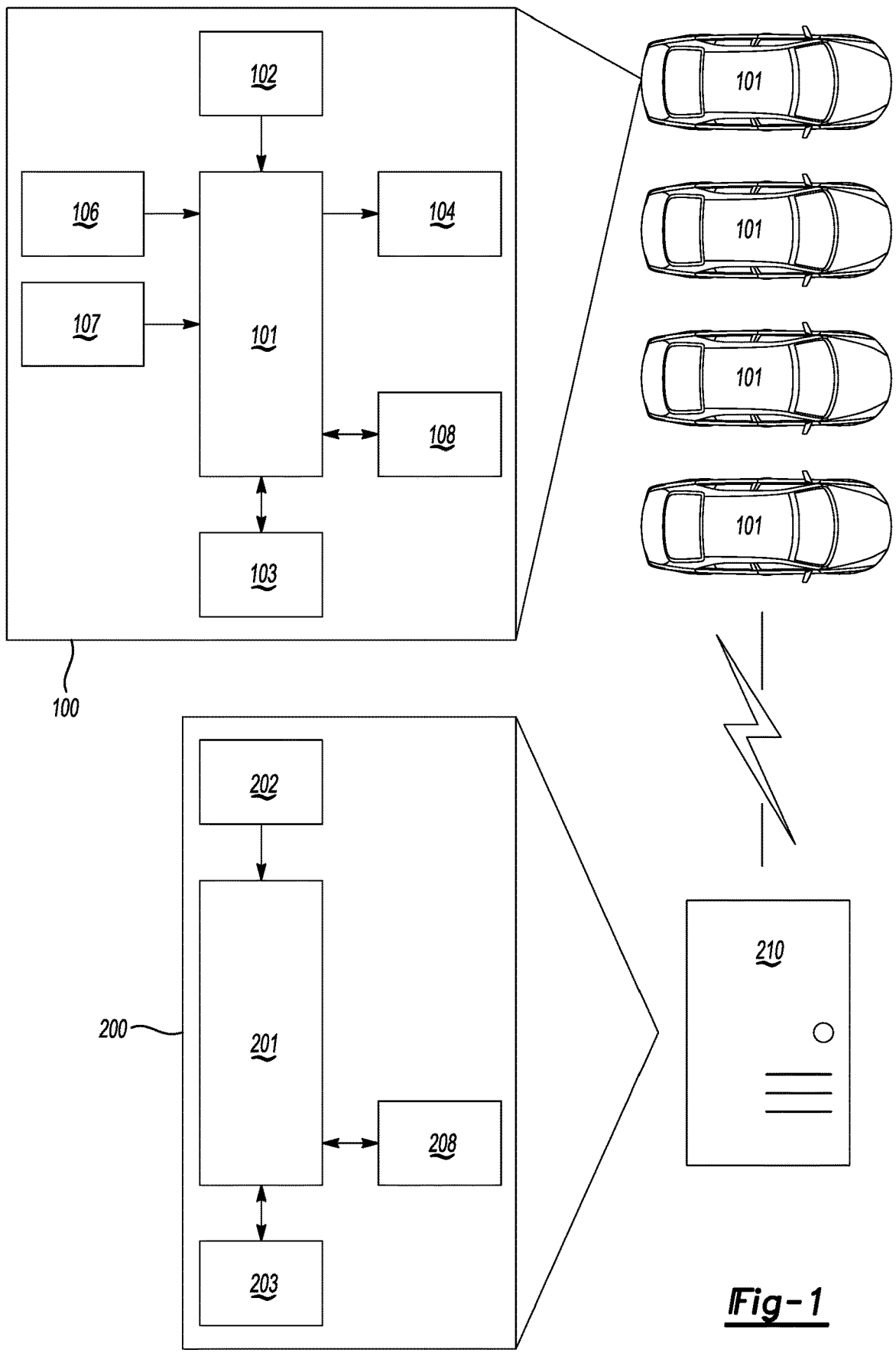
FIG. 1 shows a block diagram of an apparatus that detects and remedies a battery health condition according to an exemplary embodiment.

An apparatus and method that detect and remedies a battery health condition will now be described in detail with reference to FIGS. 1-3 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Many vehicles include a battery, such as a 12V battery, that is used to crank the engine at start and operate its electrical systems. If a vehicle sits idle for extended periods of time, the battery state-of-charge (SOC) degrades and may hit a low SOC. The longer the vehicle remains at a low SOC, the greater the risk of permanently damaging the battery. Vehicles may be started and the engine may be run periodically to address this issue. However, this may be costly, burdensome and may waste energy or fuel unnecessarily.

To address this issue more efficiently and across an entire fleet at multiple locations, vehicle sensor information, dealer information and vehicle characteristic information may be gathered and analyzed to determine whether a battery health condition that needs remedying exists. If the battery health condition exists, an alert including a list of vehicles needing the battery health condition remedied may be sent. By periodically performing this process, only vehicles that need recharging can be recharged and low a SOC condition on all vehicles can be remedied preventing permanent damage to the battery.

FIG. 1 shows a block diagram of the system and an apparatus that detects and remedies a battery health condition 100 according to an exemplary embodiment. As shown in FIG. 1, a first apparatus that detects and remedies a battery health condition 100 and a second apparatus that detects and remedies a battery health condition 100. The first apparatus that detects and remedies a battery health condition 100, according to an exemplary embodiment, may be part of a vehicle 110 and may include a controller 101, a power supply 102, a storage 103, an output 104, a user input 106, a vehicle sensor 107, and a communication device 108. However, the first apparatus that detects and remedies a battery health condition 100 is not limited to the aforementioned configuration and may be configured to include additional elements and/or omit one or more of the aforementioned elements. The second apparatus that detects and remedies a battery health condition 200 may be part of a backend server 210 and may include a controller 201, a power supply 202, a storage 203 and a communication device 208.

The first and second apparatus that detect and remedy a battery health condition 100 and 200 may be implemented as part of one or more vehicles 110, as a standalone component, as a hybrid between an on vehicle and off vehicle device, or in another computing device. The first and second apparatus that detect and remedy a battery health condition 100 and 200 may communicate with each other over wireless networks or other communication system as described further in FIG. 3. The controller 201, the power supply 202, the storage 203 and the communication device 208 are similar to a controller 101, a power supply 102, a storage 103 and a communication device 108, described below.

The controller 101 controls the overall operation and function of the apparatus that detects and remedies a battery health condition 100. The controller 101 may control one or more of a storage 103, an output 104, a user input 106, a vehicle sensor 107, and a communication device 108 of the apparatus that detects and remedies a battery health condition 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the user input 106, the vehicle sensor 107, and the communication device 108 of the apparatus that detects and remedies a battery health condition 100. The information may be sent and received via a bus or network, or may be directly read or written to/from one or more of the storage 103, the output 104, the user input 106, the vehicle sensor 107, and the communication device 108 of the apparatus that detects and remedies a battery health condition 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the controller 101, the storage 103, the output 104, the user input 106, the vehicle sensor 107, and the communication device 108, of the apparatus that detects and remedies a battery health condition 100. The power supply 102 may include one or more from among a battery, a power outlet, a capacitor, a solar energy cell, a generator, a wind energy device, an alternator, etc.

The storage 103 is configured for storing information and retrieving information used by the apparatus that detects and remedies a battery health condition 100. The storage 103 may be controlled by the controller 101 to store and retrieve information received from the vehicle sensor 107 and the communication device 108. The storage 103 may also include the computer instructions configured to be executed by a processor to perform the functions of the apparatus that detects and remedies a battery health condition 100. The information stored by the storage 103 may include information on one or more from among one or more from among vehicle sensor information, dealer information, vehicle component information including a list of components on a particular vehicle, and vehicle characteristic information. The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus that detects and remedies a battery health condition 100. The output 104 may include one or more from among a speaker, audio, a display, a centrally-located display, a head up display, a windshield display, a haptic feedback device, a vibration device, a tactile feedback device, a tap-feedback device, a holographic display, an instrument light, an indicator light, etc. The output 104 may output notification including one or more from among an audible notification, a light notification, and a display notification. The notification may include information including the battery health alert. The output may also output information to perform battery maintenance according to the determined battery health alert including charging one or more batteries listed in the determine battery health alerts by activating a battery charger or starting one The user input 106 is configured to provide information and commands to the apparatus that detects and remedies a battery health condition 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the notification output by the output 104. The user input 106 may also be configured to receive a user input to activate or deactivate the apparatus that detects and remedies a battery health condition 100. For example, the setting to turn the system on or off may be selected by an operator via user input 106.

The vehicle sensor 107 may include one or more from among a plurality of sensors configured to measure or detect information including one or more from among location, battery state of charge, power mode off, battery startup state of charge, high precision battery state of charge, open circuit battery voltage, and battery estimated temperature. Examples of sensors may include a battery current sensor, a voltage sensor, a temperature sensor, etc.

The communication device 108 may be used by apparatus that detects and remedies a battery health condition 100 to communicate with several types of external apparatuses according to various communication methods. The communication device 108 may be used to send/receive information on or more from among vehicle sensor information, dealer information and vehicle characteristic information to/from server 318, which may be embodied by second apparatus 200.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

According to an exemplary embodiment, the controller 101 of the apparatus that that detects and remedies a battery health condition 100 may be configured to receive data including one or more of vehicle sensor information, dealer information and vehicle characteristic information, analyze the received data to determine whether one or more battery health alerts are required, and transmit the one or more determined battery health alerts.

The controller 101 of the apparatus that that detects and remedies a battery health condition 100 may be configured to perform battery maintenance according to the determined battery health alert. For example, the controller 101 of the apparatus that that detects and remedies a battery health condition 100 may be configured to perform battery maintenance by charging one or more batteries listed in the determined battery health alerts by activating a battery charger or starting an engine configured to charge a battery listed in the determined battery health alerts.

The controller 101 of the apparatus that that detects and remedies a battery health condition 100 may be configured to generate a table including a list of the determined battery health alerts with corresponding dealers and to transmit the list to the dealers in the list.

The controller 101 of the apparatus that that detects and remedies a battery health condition 100 may be configured to analyze the received data further by determining if a vehicle has a low state of charge based on the battery state of charge, the startup battery state of charge, the high precision battery state of charge, the open circuit battery voltage, and the battery temperature of the vehicle sensor information and determining the battery health alerts that correspond to the vehicle that has a low state of charge.

The controller 101 of the apparatus that that detects and remedies a battery health condition 100 may be configured to analyze the received data by determining if a vehicle has had a low state of charge more than a threshold number of times over a predetermined period of time, selecting the vehicle information and dealer information corresponding to the vehicle, and determining the battery health alerts corresponding to the selected vehicle information and dealer information.

The controller 101 of the apparatus that that detects and remedies a battery health condition 100 may be configured to receive data once per predetermined period, the period being between one and seven days.

Figure 2:
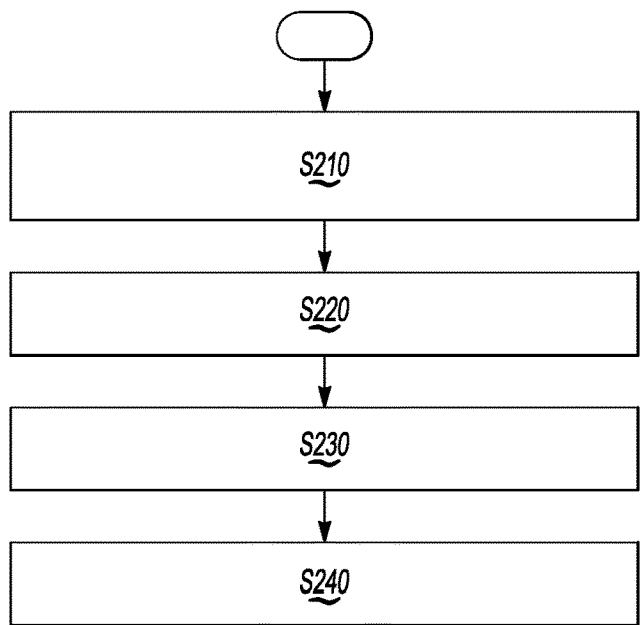
FIG. 2 shows a flowchart of a method that detects and remedies a battery health condition according to an exemplary embodiment.

FIG. 2 shows a flowchart of a method that detects and remedies a battery health condition according to an exemplary embodiment. The method of FIG. 2 may be performed by the apparatus detects and remedies a battery health condition 100 or may be encoded into a computer readable medium as instructions that are executable by a computer to perform the method.

Referring to FIG. 2, data including one or more of vehicle sensor information, dealer information and vehicle characteristic information is received in operation S210. The vehicle sensor information may include one from among location information, a battery state of charge, a power mode setting, a startup battery state of charge, a high precision battery state of charge, an open circuit battery voltage, and a battery temperature. The dealer information may include one or more from among dealer location information, climate information, region information, charging date information, charging interval information, and a charging coordinator. The vehicle characteristic information may include one or more from among a sale date, an assembly plant, a battery characteristic, vehicle component information, and a trim level.

The received data to determine whether one or more battery health alerts are required is analyzed in operation S220 is below a predetermined threshold. In one example, determining if a vehicle has a low state of charge based on the battery state of charge, the startup battery state of charge, the high precision battery state of charge, the open circuit battery voltage, and the battery temperature of the vehicle sensor information and determining the battery health alerts that correspond to the vehicle that has a low state of charge. In yet another example, analyzing the received data also includes determining if a vehicle has had a low state of charge more than a threshold number of times over a predetermined period of time, selecting the vehicle information and dealer information corresponding to the vehicle, and determining the battery health alerts corresponding to the selected vehicle information and dealer information.

Then, in operation S230, the one or more determined battery health alerts are output or transmit for the purpose of performing maintenance on batteries corresponding to the determined battery health alerts in operation S240. In one example, the performing battery maintenance based according to the determined battery health alert may include charging one or more batteries listed in the determine battery health alerts by activating a battery charger or starting one or more vehicles corresponding to the one or more batteries.

Figure 3:
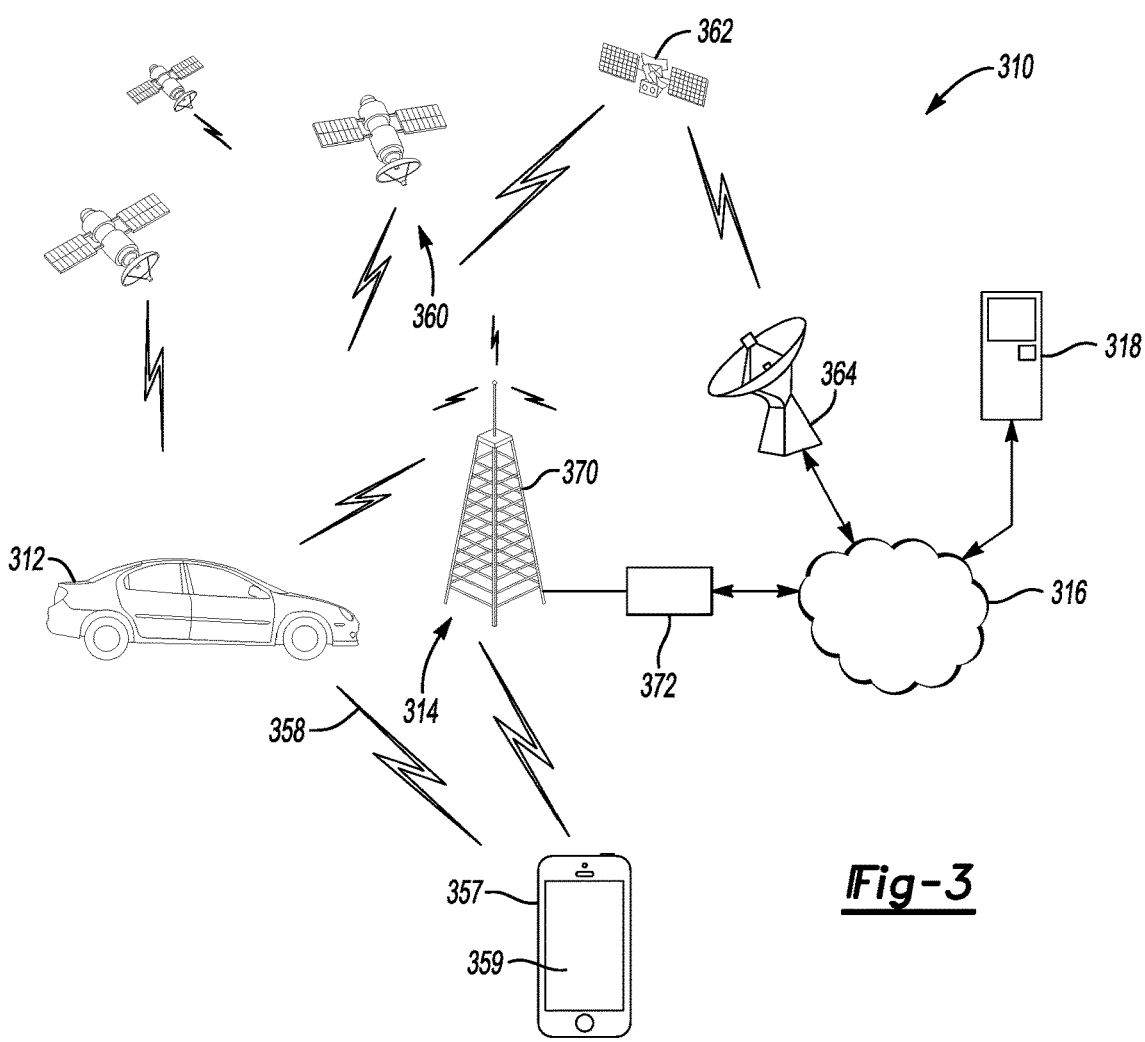
FIG. 3 shows a diagram of a system for reporting a battery health condition according to an aspect of an exemplary embodiment.

FIG. 3 shows a diagram of a system for reporting a battery health condition according to an aspect of an exemplary embodiment. In particular, FIG. 3 shows an illustration of an operating environment that comprises a mobile vehicle communications system 310 and that can be used to implement the system, apparatus and the method that detect and remedy a battery health condition 100.

Referring to FIG. 3, an operating environment that comprises a mobile vehicle communications system 310 and that can be used to implement is shown. Communications system 310 may include one or more from among a vehicle 312, one or more wireless carrier systems 314, a land communications network 316, a server or backend computer 318. It should be understood that the disclosed apparatus and the method that detect and remedy a battery health condition 100 can be used with any number of different systems and is not specifically limited to the operating environment shown here. The following paragraphs simply provide a brief overview of one such communications system 310; however, other systems not shown here could employ the disclosed apparatus and the method that detect a battery health condition as well.

Vehicle 312 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. One or more elements of apparatus that detects and remedies a battery health condition in FIG. 1 may be incorporated into vehicle 312.

One of the networked devices that can communicate with the communication devices 108, 208 is a wireless device, such as a smart phone 357. The smart phone 357 can include computer processing capability, a transceiver capable of communicating using a short-range wireless protocol 358, and a visual smart phone display 359. In some implementations, the smart phone display 359 also includes a touchscreen graphical user interface and/or a GPS module capable of receiving GPS satellite signals and generating GPS coordinates based on those signals.

The GPS module of the communication device 108 may receive radio signals from a constellation 360 of GPS satellites, recognize a location of a vehicle based on the on-board map details or by a point of interest or a landmark. From these signals the communication device 308 can determine vehicle position that is used for providing navigation and other position-related services to the vehicle driver. Navigation information can be presented by the output 104 (or other display within the vehicle) or can be presented verbally such as is done when supplying turn-by-turn navigation. The navigation services can be provided using a dedicated in-vehicle navigation module, or some or all navigation services can be done via the communication device 108. Position information may be sent to a remote location for purposes of providing the vehicle with navigation maps, map annotations (points of interest, restaurants, etc.), route calculations, and the like. The position information can be supplied to a remote computer system, such as server 318, for other purposes, such as fleet management, maintenance scheduling, and motion determination.

The vehicle 312 may include vehicle system modules (VSMs) in the form of electronic hardware components that are located throughout the vehicle and typically receive input from one or more sensors and use the sensed input to perform diagnostic, monitoring, control, reporting and/or other functions. The VSMs may include one or more of the vehicles sensors 107. Each of the VSMs may be connected by a communications bus to the other VSMs, as well as to the controller 101, and can be programmed to run vehicle system and subsystem diagnostic tests. The controller 101 may be configured to send and receive information from the VSMs and to control VSMs to perform vehicle functions. As examples, one VSM can be an electronic controller unit, an engine control module (ECM) that controls various aspects of engine operation such as fuel ignition and ignition timing, another VSM can be an external sensor module configured to receive information from external sensors such as cameras, radars, LIDARs, and lasers, another VSM can be a powertrain control module that regulates operation of one or more components of the vehicle powertrain, another VSM can include one or more of the vehicle sensors 107, and another VSM can be a body control module that governs various electrical components located throughout the vehicle, like the vehicle's power door locks and headlights. According to an exemplary embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 312, as numerous others are also available.

Wireless carrier system 314 may be a cellular telephone system that includes a plurality of cell towers 370 (only one shown), one or more mobile switching centers (MSCs) 372, as well as any other networking components required to connect wireless carrier system 314 with land network 316. Each cell tower 370 includes sending and receiving antennas and a base station, with the base stations from different cell towers being connected to the MSC 372 either directly or via intermediary equipment such as a base station controller. Cellular system 314 can implement any suitable communications technology, including for example, analog technologies such as AMPS, or the newer digital technologies such as CDMA (e.g., CDMA2000 or 1×EV-DO) or GSM/GPRS (e.g., 4G LTE). As will be appreciated by those skilled in the art, various cell tower/base station/MSC arrangements are possible and could be used with wireless system 314. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 314, a different wireless carrier system in the form of satellite communication can be used to provide uni-directional or bi-directional communication with the vehicle. This can be done using one or more communication satellites 362 and an uplink transmitting station 364. Uni-directional communication can be, for example, satellite radio services, wherein programming content (news, music, etc.) is received by transmitting station 364, packaged for upload, and then sent to the satellite 362, which broadcasts the programming to subscribers. Bi-directional communication can be, for example, satellite telephony services using satellite 362 to relay telephone communications between the vehicle 312 and station 364. If used, this satellite telephony can be utilized either in addition to or in lieu of wireless carrier system 734.

Land network 316 may be a land-based telecommunications network that is connected to one or more landline telephones and connects wireless carrier system 314 to server 318. For example, land network 316 may include a public switched telephone network (PSTN) such as that used to provide hardwired telephony, packet-switched data communications, and the Internet infrastructure. One or more segments of land network 316 could be implemented using a standard wired network, a fiber or other optical network, a cable network, power lines, other wireless networks such as wireless local area networks (WLANs), or networks providing broadband wireless access (BWA), or any combination thereof. Furthermore, call center 320 need not be connected via land network 316, but could include wireless telephony equipment so that it can communicate directly with a wireless network, such as wireless carrier system 314.

Sever 318 can be one of many computers accessible via a private or public network such as the Internet. Each such computer 318 can be used for one or more purposes, such as a web server accessible by the vehicle via the communication device 308 and wireless carrier 314. Other such accessible computers 318 can be, for example: a service center computer where diagnostic information, vehicle parameters and other vehicle data can be uploaded from the vehicle via the communication device 108; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 312. A computer 318 can also be used for providing Internet connectivity such as DNS services or as a network address server that uses DHCP or other suitable protocol to assign an IP address to the vehicle 312.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method that detects and remedies a battery health condition, the method comprising:
    receiving data for each of a plurality of vehicles, the data including vehicle sensor information, dealer information, and vehicle characteristic information;
    wherein the vehicle characteristic information is defined for each of the plurality of vehicles as a sale date, an assembly plant, a battery characteristic, a trim level, and vehicle component information;
    analyzing the received data for each of the plurality of vehicles to determine whether one or more battery health alerts are required; and outputting or transmitting the one or more determined battery health alerts to a plurality of dealers that correspond to one or more of the plurality of vehicles by generating a list of the determined battery health alerts and sending the list to one or more of the plurality of dealers.

2. The method of claim 1, further comprising performing battery maintenance according to the determined battery health alert.

3. The method of claim 2, wherein the performing battery maintenance according to the determined battery health alert comprises charging one or more batteries listed in the determined battery health alerts by activating a battery charger or starting one or more vehicles corresponding to the one or more batteries.

4. The method of claim 1, wherein the vehicle sensor information comprises one from among location information, a battery state of charge, a power mode setting, a startup battery state of charge, a high precision battery state of charge, an open circuit battery voltage, and a battery temperature.

5. The method of claim 1, wherein the dealer information comprises dealer location information, climate information, region information, charging date information, charging interval information, and a charging coordinator.

6. The method of claim 1, wherein the receiving data is performed once per predetermined period, the period being between one and seven days.

7. The method of claim 1, wherein the analyzing the received data further comprises determining if a vehicle has a low state of charge based on the battery state of charge, the startup battery state of charge, the high precision battery state of charge, the open circuit battery voltage, and the battery temperature of the vehicle sensor information and determining the battery health alerts that correspond to the vehicle that has the low state of charge.

8. The method of claim 1, wherein the analyzing the received data further comprises determining if a vehicle has had a low state of charge more than a threshold number of times over a predetermined period of time, selecting the vehicle sensor information and dealer information corresponding to the vehicle, and determining the battery health alerts corresponding to the selected vehicle sensor information and dealer information.

9. A system that detects and remedies a battery health condition, the system comprising:
  at least one memory comprising computer executable instructions; and
  at least one processor configured to read and execute the computer executable instructions, the computer executable instructions causing the at least one processor to:
  receive data for each of a plurality of vehicles, the data including vehicle sensor information, dealer information and vehicle characteristic information;
  wherein the vehicle characteristic information is defined for each of the plurality of vehicles as a sale date, an assembly plant, a battery characteristic, a trim level, and vehicle component information;
  analyze the received data for each of the plurality of vehicles to determine whether one or more battery health alerts are required; and
  transmit the one or more determined battery health alerts to a plurality of dealers that correspond to one or more of the plurality of vehicles by generating a list of the determined battery health alerts and sending the list to one or more of the plurality of dealers.

10. The system of claim 9, further comprising a vehicle configured to perform battery maintenance according to the determined battery health alert.

11. The system of claim 10, wherein the vehicle is configured to perform battery maintenance by charging one or more batteries listed in the determined battery health alerts by activating a battery charger or starting an engine configured to charge a battery listed in the determined battery health alerts.

12. The system of claim 9, wherein the vehicle sensor information comprises one from among location information, a battery state of charge, a power mode setting, a startup battery state of charge, a high precision battery state of charge, an open circuit battery voltage, and a battery temperature.

13. The system of claim 9, wherein the dealer information comprises one or more from among dealer location information, climate information, region information, charging date information, charging interval information, and a charging coordinator.

14. The system of claim 9, wherein the computer executable instructions cause the at least one processor to receive data once per predetermined period, the period being between one and seven days.

15. The system of claim 9, wherein the computer executable instructions cause the at least one processor to analyze the received data by determining if a vehicle has a low state of charge based on the battery state of charge, the startup battery state of charge, the high precision battery state of charge, the open circuit battery voltage, and the battery temperature of the vehicle sensor information and determining the battery health alerts that correspond to the vehicle that has the low state of charge.

16. The system of claim 9, wherein the computer executable instructions cause the at least one processor to analyze the received data by determining if a vehicle has had a low state of charge more than a threshold number of times over a predetermined period of time, selecting the vehicle sensor information and dealer information corresponding to the vehicle, and determining the battery health alerts corresponding to the selected vehicle sensor information and dealer information.

* * * * *